United States Patent
Lepidis et al.

(10) Patent No.: US 8,621,932 B2
(45) Date of Patent: Jan. 7, 2014

(54) PRESSURE MEASURING DEVICE AND METHOD FOR ASCERTAINING PRESSURE VALUES

(75) Inventors: Polichronis Lepidis, Reutlingen (DE); Maxime Loidreau, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 139 days.

(21) Appl. No.: 13/175,243

(22) Filed: Jul. 1, 2011

(65) Prior Publication Data
US 2012/0000292 A1    Jan. 5, 2012

(30) Foreign Application Priority Data
Jul. 2, 2010 (DE) .......................... 10 2010 030 845

(51) Int. Cl.
*G01L 19/04* (2006.01)
*G01L 9/00* (2006.01)
*G01L 9/16* (2006.01)

(52) U.S. Cl.
USPC .............................................. 73/708; 73/754

(58) Field of Classification Search
USPC ..................................................... 73/700–756
See application file for complete search history.

(56) References Cited

U.S. PATENT DOCUMENTS

| | | | |
|---|---|---|---|
| 2004/0144178 A1* | 7/2004 | Ohmi et al. | 73/708 |
| 2007/0295095 A1* | 12/2007 | Kurtz et al. | 73/714 |
| 2010/0257936 A1* | 10/2010 | Kurtz et al. | 73/721 |

* cited by examiner

*Primary Examiner* — Andre Allen
(74) *Attorney, Agent, or Firm* — Kenyon & Kenyon LLP

(57) ABSTRACT

A pressure measuring device includes a pressure sensor element and an analog-digital converter. An output signal voltage of the pressure sensor element is a function of a temperature and is applied as an input voltage to an input of the analog-digital converter. The analog-digital converter is adapted to convert any input voltage from input voltage ranges which vary with a temperature into a digital value representing the input voltage.

12 Claims, 3 Drawing Sheets

PRESSURE MEASURING DEVICE AND METHOD FOR ASCERTAINING PRESSURE VALUES

CROSS-REFERENCE TO RELATED APPLICATIONS

The present application claims priority to Application No. 10 2010 030 845.5, filed in the Federal Republic of Germany on Jul. 2, 2010, which is expressly incorporated herein in its entirety by reference thereto.

FIELD OF THE INVENTION

The present invention relates to a pressure measuring device and a method for ascertaining pressure values.

BACKGROUND INFORMATION

Certain pressure measuring devices, in particular also such as those that include micromechanical pressure sensor elements, are conventional. They are presently firmly established in automotive engineering and are used in that area for multiple functions. Typical applications are, for example, detection of intake manifold pressures and charge pressures for optimizing the engine control.

In addition to sensors in analog circuit technology, which have been available for many years, lately micromechanical pressure measuring devices, implemented in digital circuit technology, are being increasingly marketed. The underlying objects of signal processing have remained essentially the same. One main object of the downstream electronic analyzer circuit is the elimination of the temperature dependency of the micromechanical sensor element. In particular when piezoresistive pressure sensor elements are used, this elimination is very important for being able to achieve high measuring accuracy over the entire temperature range because of the strong temperature dependency of the piezoresistive transduction constant.

In analog pressure measuring devices the temperature dependency is compensated for by using a temperature-dependent supply voltage, which is reciprocal to the temperature dependency of the piezoresistive transduction constant.

In digital pressure measuring devices a piezoresistive bridge is supplied with a constant voltage, the output voltage is digitized with the aid of an analog-digital converter, and the temperature dependency of the signal is subsequently corrected with high precision via digital signal processing.

Both of the above-described methods have disadvantages due to their principle of operation.

Emulating the reciprocal temperature-dependent bridge supply voltage is only achievable with limited accuracy in analog circuit technology, since in this case components having non-linear characteristics are needed, which cannot be easily adjusted in a targeted manner. In addition, the adjusted curve may change over time due to drifts, so that impaired accuracy over the service life of the pressure measuring device is to be expected.

Although the digital correction method does not have these disadvantages, the correction in digital signal processing may be set with high accuracy and therefore made constant over the service life of the component. However, in this method, a high output voltage range of the pressure sensor element over the temperature is accepted, which must be taken into account in the input voltage range of the analog-digital converter. As a result, the achievable accuracy of the analog-digital conversion decreases.

SUMMARY

According to example embodiments of the present invention, a pressure measuring device having a pressure sensor element and an analog-digital converter is provided. An output signal voltage of the pressure sensor element is temperature-dependent and may be applied to an input of the analog-digital converter as an input voltage. The analog-digital converter is adapted for converting any input voltage from input voltage ranges which vary with a temperature into a digital value representing the input voltage. It is thereby achieved that different ranges of input voltage values whose widths have a high temperature dependency are digitally mappable. Individual values from an input voltage range are converted into corresponding digital values, subject to a quantization error, which is unavoidable due to the digitizing process. The effect of temperature-dependent offset or charge spread on input voltage ranges reserved for the analog-digital converter may be taken into account by a suitable arrangement of the analog-digital converter.

This is typically accomplished by being able to temperature-dependently vary an input voltage resolution of the analog-digital converter such that the temperature-dependence of the output signal voltage of the pressure sensor element is partially or fully compensated for. Input voltage resolution is to be understood here as the width of the quantization step of the analog-digital converter, i.e., of the range of the input voltage signal which is represented by the same output signal of the analog-digital converter.

According to example embodiments of the present invention, it is provided that a temperature-dependent reference voltage may be applied to the analog-digital converter.

The pressure sensor element may be a piezoresistive pressure sensor element and may include a piezoresistive bridge.

The reference voltage of the analog-digital converter may be preferably varied reciprocally to a piezoresistive transduction constant of the pressure sensor element. The piezoresistive transduction constant represents the increase in the output signal voltage of the pressure sensor element per increase in the pressure acting on the pressure sensor element and is strongly temperature-dependent. Via this selection of the reference voltage it is achieved that the width of the quantization steps of the analog-digital converter corresponds, in a temperature-independent manner, to a certain pressure differential, so that, after the zero point compensation, the same pressures at different temperatures are represented by the same digital values at the output of the analog-digital converter.

It is furthermore preferred that an arithmetic unit is provided, which is adapted to compute, on the basis of a digital output signal of the analog-digital converter and of a temperature value, a pressure value which is largely independent of the effect of the temperature Another aspect relates to a method for ascertaining the pressure value. A temperature-dependent output signal voltage of a pressure sensor element, in particular of a piezoresistive pressure sensor element, is applied to an input of the analog-digital converter as an input voltage. A digital value is output at the output of the analog-digital converter. The analog-digital converter is adapted, as a function of the temperature, such that any input voltage from input voltage ranges which vary with the temperature may be converted into a digital value representing the input voltage.

In example embodiments, an input voltage resolution of the analog-digital converter is varied, as a function of the temperature, such that the temperature-dependence of the output signal voltage of the pressure sensor element is partially or fully compensated for. A reference voltage of the analog-digital converter may be varied as a function of the temperature. The reference voltage of the analog-digital converter is typically varied reciprocally to a piezoresistive transduction constant of the pressure sensor element.

Exemplary embodiments of the present invention are described in greater detail with reference to the drawing and the description that follows.

DETAILED DESCRIPTION

Figure 1:
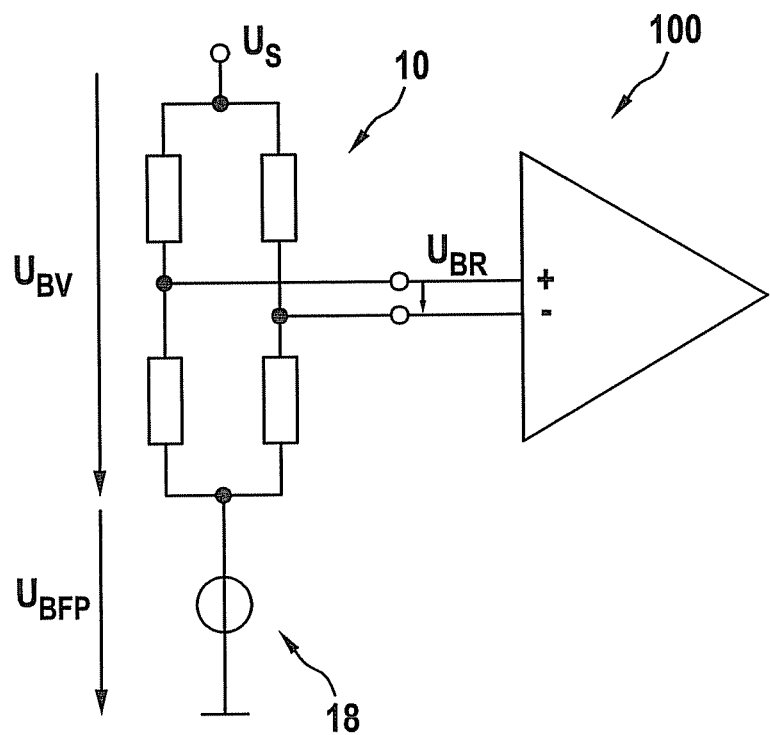
FIG. 1 shows a conventional measured pressure value detection according to the related art (analog).

FIG. 1 shows a conventional measured pressure value detection in an analog circuit. A pressure measuring device identified overall with reference numeral 100 includes a piezoresistive pressure sensor element 10 in the form of a measuring bridge (Wheatstone bridge). Measuring bridge 10 has four piezoresistive resistor elements, whose impedance changes irregularly as a function of a pressure applied thereto. In the center of measuring bridge 10, a bridge voltage $U_{Br}$ is picked up as an output voltage signal, which is a function of the mechanical deformation of the resistor elements and of a temperature. Measuring bridge 10 is supplied by a bridge supply voltage UBV, which is the difference between a supply voltage Us and a bridge base point voltage UBFP, which is delivered by a voltage source 18. Bridge base point voltage UBFP is regulated as a function of the temperature and is used for generating a preferably linear temperature-independent output signal $U_{Br}$ of pressure sensor element 10.

Providing a suitable bridge base point voltage UBFP is achievable, in analog circuit technology, in particular for the non-linear parameters, only with a non-satisfactory accuracy and is also made difficult by drifts of the analog components used over the service life of pressure sensor element 10.

Figure 2:
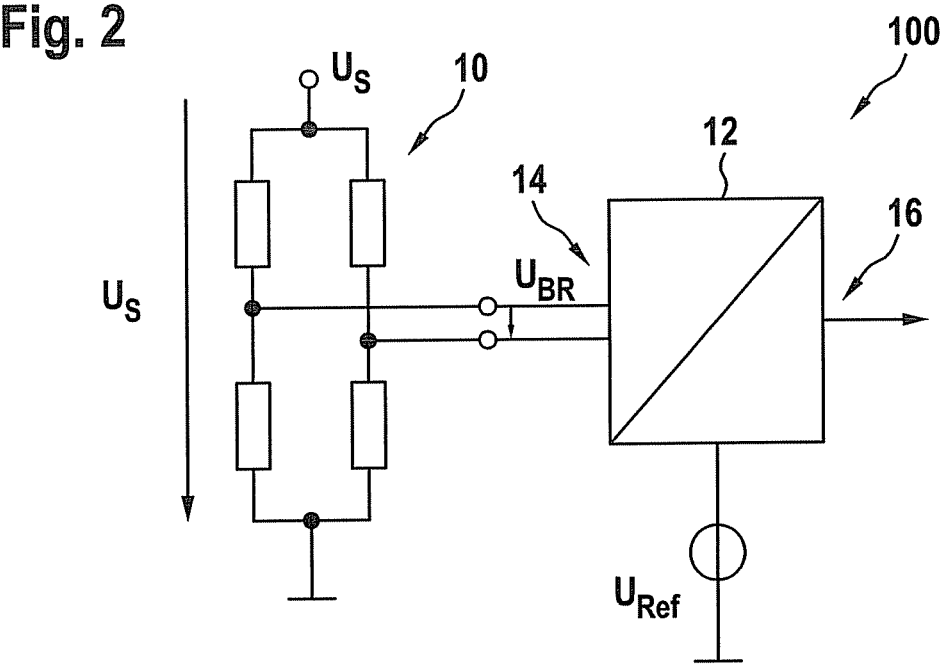
FIG. 2 shows conventional a measured pressure value detection according to the related art (digital).

FIG. 2 shows a conventional measured pressure value detection in a digital circuit. Measuring bridge 10 is supplied here with a constant supply voltage US. Output voltage signal $U_{Br}$ is applied to an input 14 of an analog-digital converter 12, which is supplied with a constant reference voltage $U_{Ref}$. Digital output signal 16 of analog-digital converter 12 is supplied to an arithmetic unit (not illustrated), which eliminates the temperature-dependence of output signal 16 and computes a pressure value which is largely independent of temperature effects. The problem here is that voltage values from input voltage ranges which vary considerably as a function of the temperature are applied to input 14 of analog-digital converter 12 and result in an unfavorable ratio between the intended and the directly used input voltage range of analog-digital converter 12. At a given output bit width of analog-digital converter 12, an effective impairment of the input voltage resolution of analog-digital converter 12 thus results.

Figure 3:
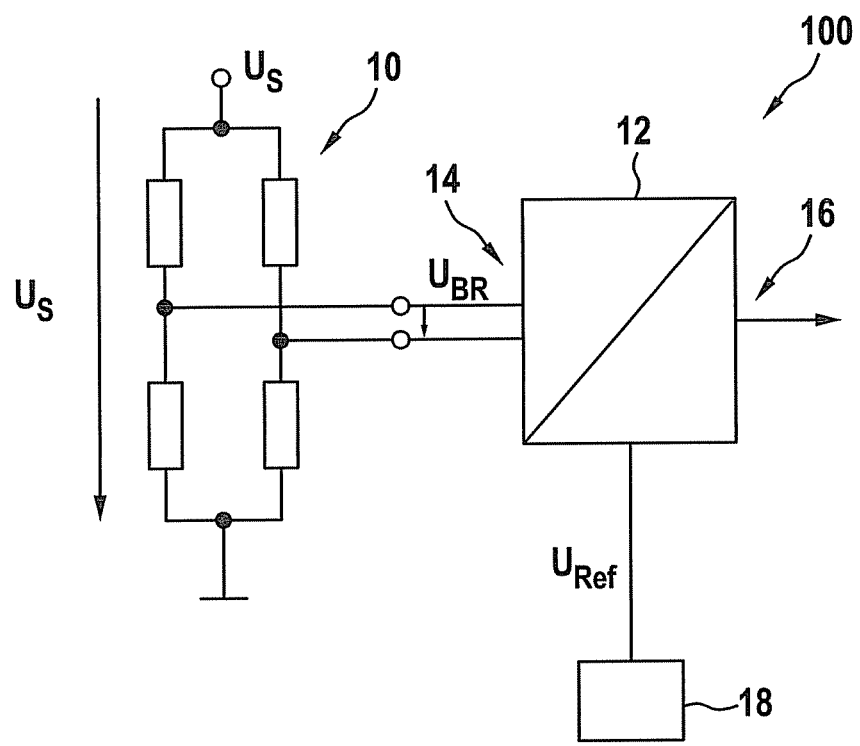
FIG. 3 shows a measured pressure value detection according to an exemplary embodiment of the present invention.

FIG. 3 shows a pressure measuring device according to an example embodiment of the present invention. It is identical to the circuit illustrated in FIG. 2 but, unlike it, it is provided that reference voltage $U_{Ref}$ applied to analog-digital converter 12 is not constant, but varies as a function of the temperature. A circuit component 18, which may also be part of analog-digital converter 12 (not illustrated), generates the temperature-dependent reference voltage $U_{Ref}$, which makes it possible to map the entire input voltage range which may be considered for a given temperature and which defines the possible value range of the individual voltages applied to input 14 of analog-digital converter 12.

This is achieved by setting reference voltage $U_{Ref}$ of analog-digital converter 12 reciprocally to the piezoresistive transduction constant of pressure sensor element 10. The individual comparator thresholds of analog-digital converter 12 are thereby adapted as a function of the temperature. Reference voltage $U_{Ref}$ of analog-digital converter 12 is generated in circuit component 18 with the aid of digital signal processing, so that the curve of reference voltage $U_{Ref}$ may be set with high accuracy and in a time-invariant manner via the temperature. By correcting the piezoresistive temperature-dependence directly at analog-digital converter 12, the effect of the temperature-dependent output voltage swing may be significantly reduced, so that an adapted input voltage resolution is obtained, which results in improved accuracy of pressure measuring device 100.

Figure 4A:
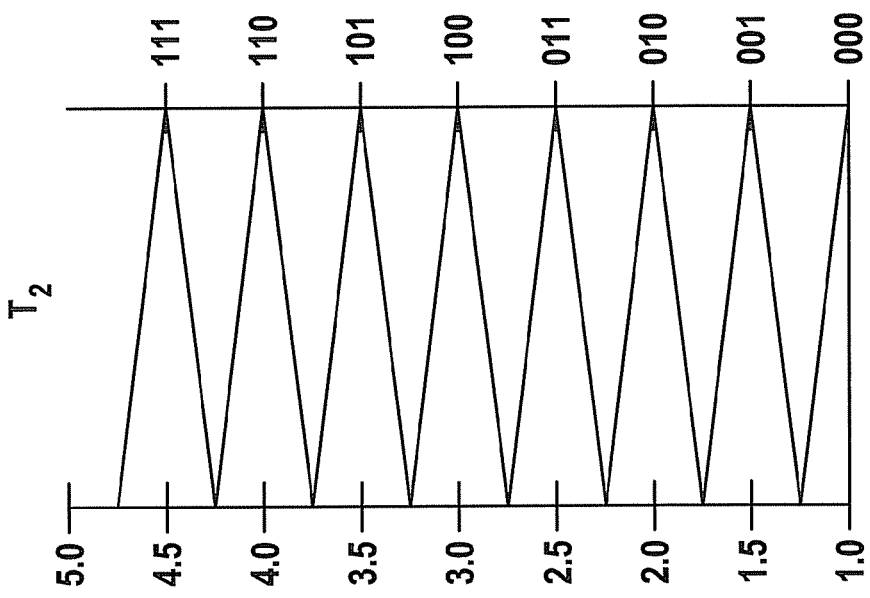
FIG. 4 schematically shows a digital representation of input voltage ranges which vary with the temperature, which is achieved by the measured pressure value detection according to an example embodiment of the present invention.
Figure 4B:
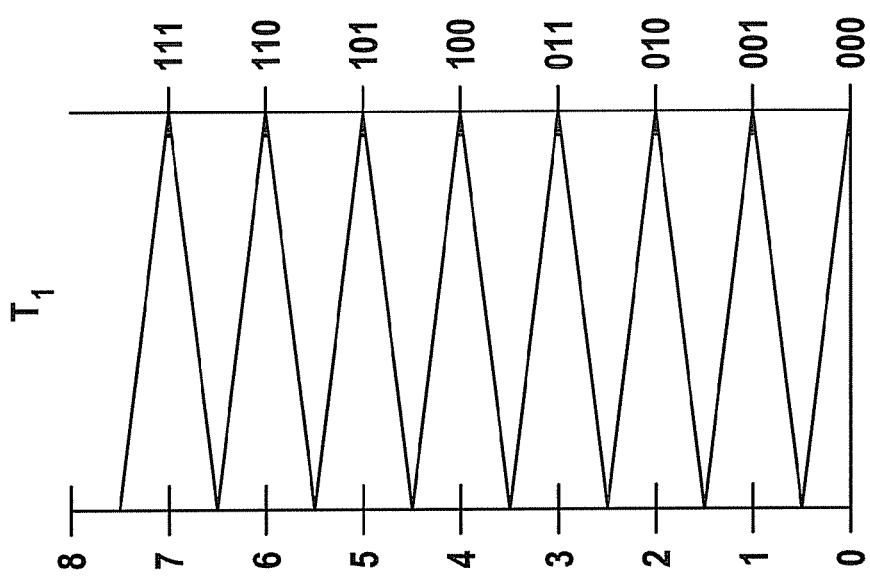

FIG. 4 schematically shows how input voltage ranges which vary with the temperature are digitally represented in the measured pressure value detection according to an example embodiment of the present invention. The value ranges described are only exemplary. At a first temperature T1 (FIG. 4a), the pressures exerted on the pressure sensor element, which are greater than a minimum pressure Pmin and less than a [maximum] pressure Pmax, generate output voltage signals $U_{Br}$ in a (dimensionless) voltage value range between 0 and 8. This voltage value range is, at the same time, the input voltage range, which is intended for input 14 of analog-digital converter 12. Analog-digital converter 12 is designed for converting any input voltage from this input voltage range into a digital value representing the input voltage, subject to a quantization error which is unavoidable due to the digitizing process. The input voltage resolution of analog-digital converter 12, i.e., the width of the range of the input voltage signal which is represented by the same output signal of analog-digital converter 12, is equal to 1 at first temperature T1.

At a second temperature T2 (FIG. 4b), the pressures from the same pressure value range (greater than minimum pressure Pmin and less than maximum pressure Pmax) exerted on the pressure sensor element generate output voltage signals $U_{Br}$ in a voltage value range between 1 and 5, the modified voltage value range being caused by a temperature-dependent change in the offset and in the piezoresistive transduction constant. Analog-digital converter 12 is adapted as a function of the temperature such that any input voltage from the new input voltage range is converted into a digital value representing the input voltage. The input voltage resolution of analog-digital converter 12 at second temperature T2 is equal to 0.5.

If, during a transition from first temperature T1 to second temperature T2 no adaptation of analog-digital converter 12 took place, the input voltage resolution would remain unchanged, which would result in an effective resolution loss in the pressure measurement.

What is claimed is:
1. A pressure measuring device, comprising:
a pressure sensor element;
an analog-digital converter; and a circuit component generating a reference voltage applied to the analog-digital converter that varies as a function of temperature;

wherein an output signal voltage of the pressure sensor element has a temperature-dependence and is supplied as an input voltage to an input of the analog-digital converter; and wherein the analog-digital converter converts the temperature-dependent input voltage into a temperature independent digital value based on the applied reference voltage.

2. The pressure measuring device according to claim 1, wherein an input voltage resolution of the analog-digital converter variable as a function of the temperature such that the temperature-dependence of the output signal voltage of the pressure sensor element is at least one of (a) partially or (b) fully compensated for.

3. The pressure measuring device according to claim 1, wherein a temperature-dependent reference voltage is applicable to the analog-digital converter.

4. The pressure measuring device according to claim 1, wherein the pressure sensor element includes a piezoresistive pressure sensor element.

5. The pressure measuring device according to claim 4, wherein the pressure sensor element includes a piezoresistive bridge.

6. The pressure measuring device according to claim 4, wherein the reference voltage of the analog-digital converter variable reciprocally to a piezoresistive transduction constant.

7. The pressure measuring device according to claim 1, further comprising an arithmetic unit configured to compute, wherein a digital output signal of the analog-digital converter is supplied to the arithmetic unit to calculate a pressure value which is substantially independent of the effect of a temperature value.

8. A method for ascertaining pressure values, comprising:
applying a temperature-dependent output signal voltage of a pressure sensor element as an input voltage to an input of an analog-digital converter;
generating a reference voltage that varies as a function of temperature;
applying the reference voltage to the analog-digital converter; and
converting the temperature-dependent input voltage into a temperature independent digital value based on the applied reference voltage applied to the analog-digital converter.

9. The method according to claim 8, wherein the pressure sensor element includes a piezoresistive pressure sensor element.

10. The method according to claim 8, wherein an input voltage resolution of the analog-digital converter is variable as a function of the temperature such that the temperature-dependence of the output signal voltage of the pressure sensor element is at least one of (a) partially or (b) fully compensated for.

11. The method according to claim 8, wherein a reference voltage of the analog-digital converter is varied as a function of the temperature.

12. The method according to claim 11, wherein the reference voltage of the analog-digital converter is varied reciprocally to a piezoresistive transduction constant.

* * * * *